W. FLEET.
HORSESHOE ATTACHMENT.
APPLICATION FILED JAN. 20, 1912.
1,111,303. Patented Sept. 22, 1914.
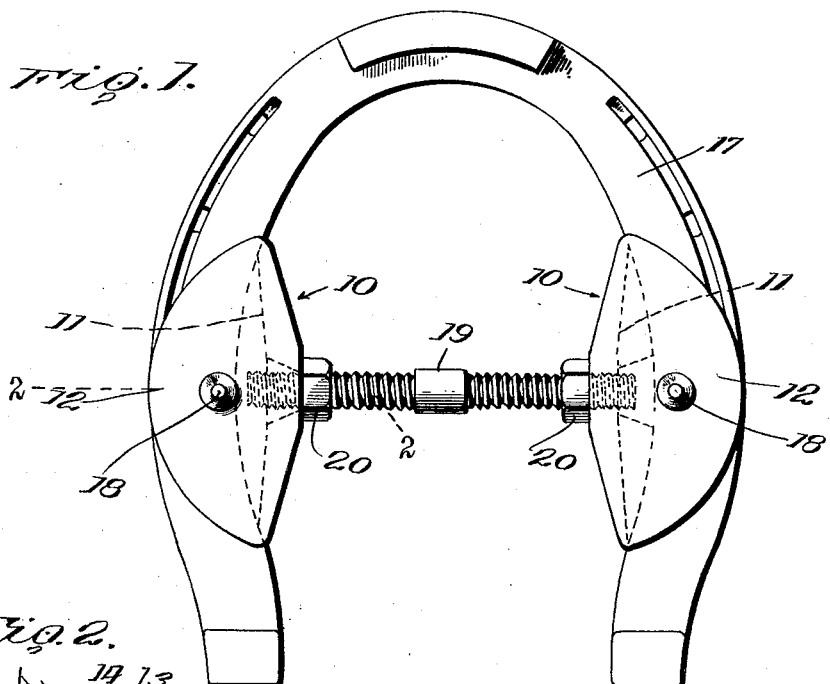
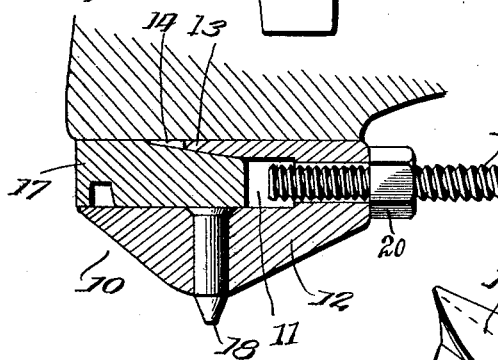
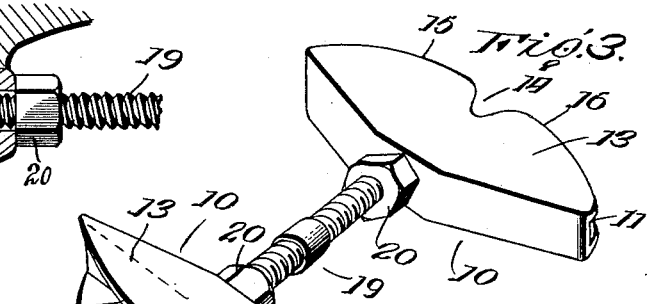
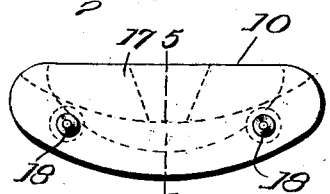
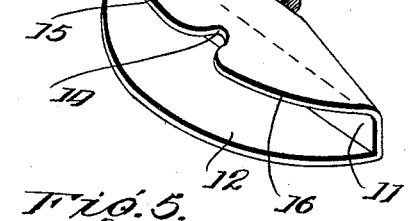
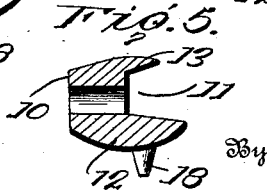
Inventor
W. Fleet

UNITED STATES PATENT OFFICE.

WILLIAM FLEET, OF LONG BRANCH, NEW JERSEY.

HORSESHOE ATTACHMENT.

1,111,303.  Specification of Letters Patent.  Patented Sept. 22, 1914.

Application filed January 20, 1912. Serial No. 672,387.

*To all whom it may concern:*

Be it known that I, WILLIAM FLEET, citizen of the United States, residing at Long Branch, in the county of Monmouth and State of New Jersey, have invented certain new and useful Improvements in Horseshoe Attachments, of which the following is a specification.

This invention relates to horse shoes, and has for its object to provide an improved spur attachment which may be readily applied and which may be readily attached to or detached from the shoe without removing the same from the hoof.

Another object of the invention is to provide a simply constructed spur attachment which may be readily adapted without structural change to shoes of various sizes and forms and without removing the same from the hoof.

With these and other objects in view, the invention consists in certain novel features of construction as hereafter shown and described, and then specifically pointed out in the claims, and in the drawings illustrative of the preferred embodiment of the invention: Figure 1 is a bottom plan view of a conventional horse shoe with the improvement applied; Fig. 2 is a sectional detail enlarged on the line 2—2 of Fig. 1; Fig. 3 is a perspective view of the improved attachment; Fig. 4 is a bottom plan view of a modified form of the clip; Fig. 5 is a cross section on the line 5—5 of Fig. 4.

Corresponding and like parts are referred to in the following description and indicated in all the views of the drawings by the same reference characters.

The improved attachment comprises in general coacting clips each having a spur and adapted to be engaged with a horse shoe preferably with the opposite sides of the same so that a shoe may be very quickly supplied with ice or snow-engaging spurs and the attachment as quickly removed when the spurs are no longer required.

The clips are precisely alike, and the description of one will suffice for both. Each clip comprises a body 10 preferably curved longitudinally and likewise channeled longitudinally as represented at 11 whereby a lower relatively heavy portion 12 and a smaller and relatively light upper portion 13 is produced. The upper portion 13 of the clip is reduced in thickness and relatively thin at the outer edges and each is also preferably formed with a central recess 14 whereby two thin blade-like portions 15—16 are produced which may be forced between the hoof and the upper face of the shoe and without loosening the shoe or injuring the hoof of the horse, while the larger portion 12 extends beneath the shoe which is represented as a whole at 17. Each of the larger lower portions 12 is provided with a spur 18, which is preferably inserted from the inside and enlarged at the inner end to prevent its dropping out and retained in position by contact with the lower face of the shoe. By this simple means when the spur becomes worn or broken it can readily be replaced by knocking out the broken or impaired spur and replacing it with a new one at small expense. The clips are constructed preferably of cast metal preferably malleableized or steel, while the spurs will be of tempered steel.

The clips are each perforated to receive a threaded rod 19 which thus extends between each pair of the clips and is provided with clamp nuts 20 which bear respectively against the inner faces of the clips and thus operate to separate the clips and hold them firmly in engagement with the opposite sides of the shoe. The apertures in the clips for the rod 19 are preferably large enough to permit the clips to rock to a limited extent upon the rod so that the clips will automatically adjust themselves to the curvature of the shoe and likewise to the variations in the curvature or clips of the shoe. By this simple means it will be obvious that the attachment may be readily applied to a shoe without detaching the shoe from the hoof, and thus provide an effectual pair of spurs to the shoe for use in icy or snowy weather, and which may be readily detached when not required.

In Figs. 4 and 5, a modified form of clip is shown with two of the spurs in each lower member 12, which may be employed under some circumstances if required.

Having thus described the invention, what is claimed as new is:

1. An attachment for horseshoes including co-acting clips adapted to be applied to opposite sides of the shoe, each of said clips including spaced upper and lower walls, and a connecting wall between the upper and lower walls, said connecting wall being curved to oppose the curvature of the adjacent edge of the horseshoe whereby the terminals of the connecting wall will alone engage the edge of the shoe, a screw rod interposed between the clips and having its terminals insertible through the connecting wall thereof into the space defined by the inner faces of the connecting walls and the adjacent edges of the shoe, and independently operable nuts threaded on the screw rod and bearing against the outer faces of the connecting walls.

2. An attachment for horseshoes including co-acting clips adapted to be applied to opposite sides of the shoe, each of said clips including spaced upper and lower walls, and a connecting wall integral with the upper and lower walls, said connecting wall being curved to oppose the curvature of the adjacent edge of the horseshoe whereby the terminal edges of the connecting wall will alone engage the shoe, each of said connecting walls being provided at an approximate central point with a substantially conical aperture, a screw rod interposed between the clips and having its terminals insertible through the conical apertures thereof and into the space which is included between the inner faces of the connecting walls and the adjacent edges of the shoe, the outer face of each connecting wall having a flat central portion which lies in a plane at right angles to the axis of the conical aperture, those portions of the outer face of each connecting wall which lie between the flattened portions and the terminals of the clips extending at an angle to the flattened portions, and nuts threaded on the screw rod and engageable against the flattened portions of the outer faces of the connecting rod.

In testimony whereof I affix my signature in presence of two witnesses.

WILLIAM FLEET. [L. S.]

Witnesses:
SARAH J. VAN GELDER,
GEORGE W. VAN GELDER.

---

Copies of this patent may be obtained for five cents each, by addressing the "Commissioner of Patents, Washington, D. C."